Figure 1:
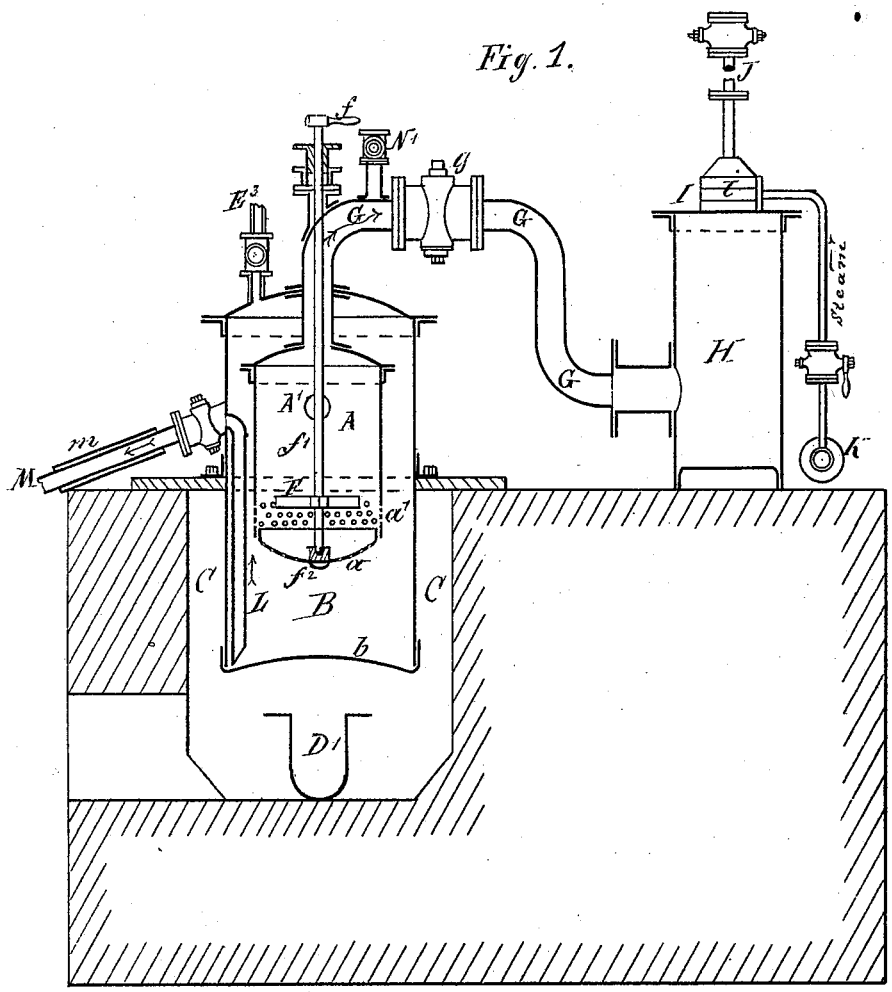

H. O. P. LISSAGARAY.
APPARATUS FOR MANUFACTURING FERTILIZERS.

No. 171,828. Patented Jan. 4, 1876.

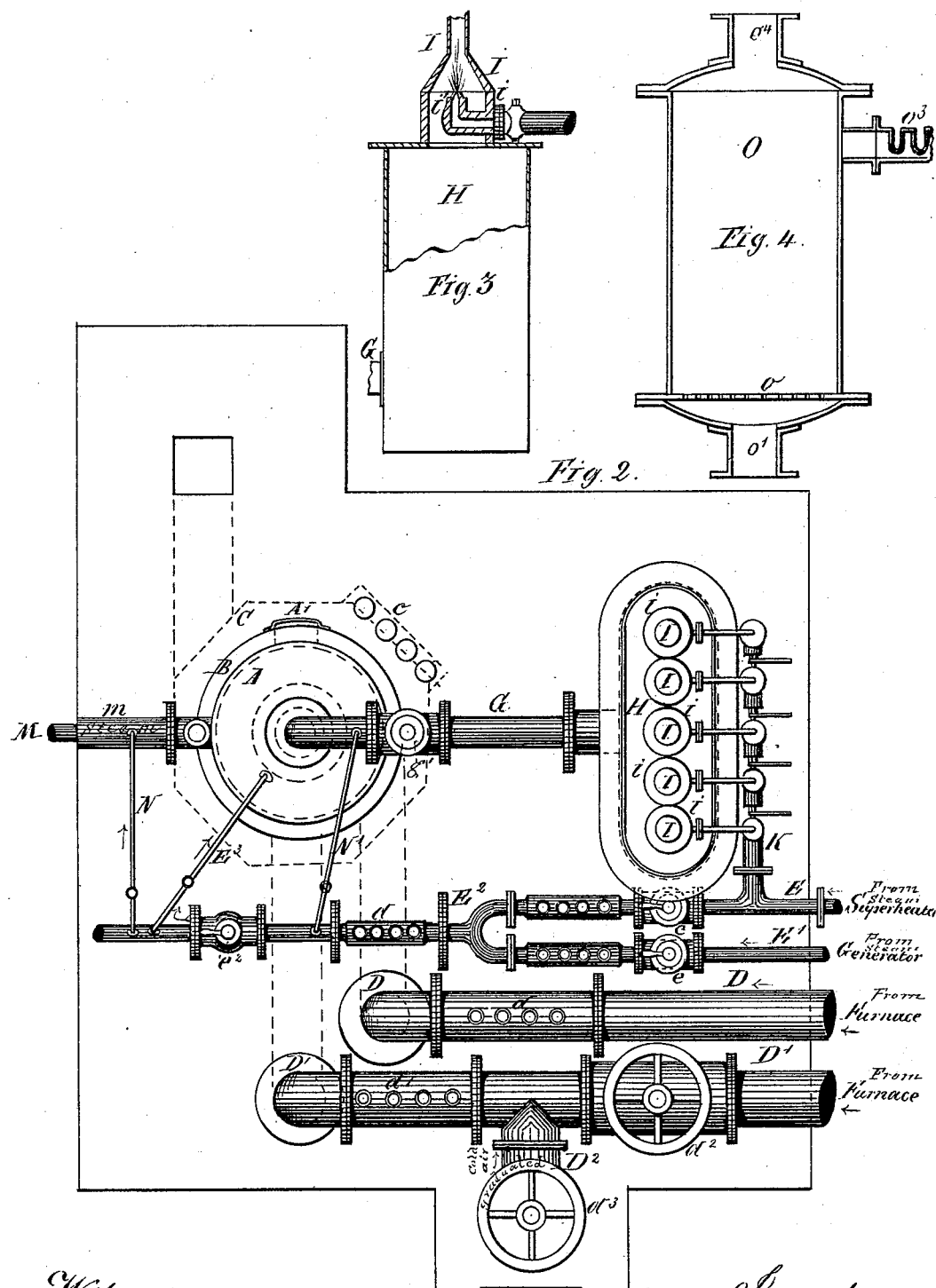

UNITED STATES PATENT OFFICE.

HENRI O. P. LISSAGARAY, OF PANTIN, NEAR PARIS, FRANCE.

IMPROVEMENT IN APPARATUS FOR MANUFACTURING FERTILIZERS.

Specification forming part of Letters Patent No. 171,828, dated January 4, 1876; application filed August 10, 1875.

*To all whom it may concern:*

Be it known that I, HENRI O. P. LISSAGARAY, of Pantin, near Paris, Department of Seine, France, have invented certain Improvements in the Manufacture of Manure, and in the Apparatus employed therein, of which the following is a specification:

My invention relates to a new and useful apparatus for manufacturing or converting nitrogenous substances—such as wool, horn, leather, &c.—into soluble and putrescible fertilizers.

Various attempts have been made to utilize substances containing nitrogen in considerable quantities, such as those enumerated above, by rendering the nitrogen assimilable, and it is well known that its solubility and chemical action—hence its assimilation—can only be effected by the subdivision or comminution of said substances, and to that end have tended all attempts heretofore made; and horn has been used in powder or shavings, as well as leather in shavings, and wool as an organic precipitate, or in a powdered state, effected by torrefaction and subsequent pulverization by mechanical agents. The process for obtaining the organic precipitate of wool has been to dissolve the wool in sulphide of sodium, which allows, by filtration, of the separation of any cotton that may be mixed with the wool, and by decomposing the sulphide of sodium with an acid the resultant sulphureted hydrogen is liberated and all the organic matter is obtained as a precipitate, from which, however, the nitrogen is not eliminated. In fact, the aim of this process is the retention of the nitrogenous properties, which is the case where wool in a pulverized condition, as a result of torrefaction and subsequent pulverization, has been used, the main endeavor being to arrest torrefaction prior to the elimination of gases from the wool, this being generally determined both by the color as well as the odor emitted, thus retaining all the nitrogen in the torrefied product; and, in order to cause putrefaction, the admixture of lime, sulphate of lime, or the superphosphate of lime has been resorted to, both with the organic precipitate and the roasted wool in powder, or the shavings of horn or leather—a process not only imperfect, but very slow in its effect, owing to the presence of the nitrogen as retarding agent.

My invention has for its object to overcome the difficulties heretofore encountered, and render the products of nitrogenous substances not only highly assimilable with other substances or chemicals, but also readily putrefied.

By experience I have found that the nitrogenous substances herein referred to belong to that class called epidermic, and in their chemical composition are but unimportant modifications of the same, and, when treated by my process, they all give a product of a similar chemical composition, whether wool, horn, or leather has been employed; and to that effect I place the material or substance in a closed vessel, and heat the same to a degree sufficient to produce a commencement of dry distillation, agitating the substance under treatment by means of a stirrer or stirrers. When a certain degree of heat has been reached the liberation of the gases, either sulphureted or phosphoreted, will take place, the weight of which will be about one-fifth or one-sixth that of the substance under treatment. This liberation of gases is essential, as it will subsequently facilitate and promote the putrefaction of the products, while their presence, as already mentioned, would retard the putrefaction. The ammonia, as a product of distillation, is gathered and condensed in the sulphuric acid to form sulphate of ammonia, which is subsequently reincorporated with the organic product; and this reincorporation has the following advantages: First, it restitutes to the organic product the eliminated nitrogen in the most assimilable form. Second, under the influence of the organic matter, which reduces it by absorbing its oxygen, the sulphate of ammonia becomes a powerful putrefying agent. Third, after elimination of the gases the residuum constitutes a viscous liquid, susceptible of being brought to a boiling-point, and which may be readily made to circulate in pipes by the pressure of steam, and by these means may be readily manufactured at a slight expense and in any quantity, and utilized as a fertilizer.

I would here observe that, although I prefer to subject the material under treatment to a dry distillation until it has lost from one-fifth to one-sixth of its weight by the elimination of gases, I do not wish to limit myself to that proportion, as it may be exceeded, according to special requirements.

The gaseous products vary in their chemical composition as well as in their physical aspect, and are collected and condensed to be afterward mixed with the organic products. When the heat in the apparatus has reached 180° or 190° the material becomes soft and forms a homogeneous viscous mass, which is brought to ebullition by raising the heat to 215° or 220°, when it is withdrawn, or allowed or made to flow from the apparatus, and is then allowed to cool and harden, in which state it is exceedingly friable, and, when pulverized, highly soluble; hence easily assimilated with other substances. It is also well known that leather is imputrescible, owing to the tannin it contains, and its treatment heretofore, with a view to utilizing it as a fertilizer, has resulted unfavorably, if not in a complete failure. By my apparatus, however, the tannin is not only removed by distillation, but its effects destroyed, and thus leather may be readily converted into a valuable fertilizing agent.

The chemical character of the organic products obtained may be enumerated as follows: First, they are soluble in water, and, by the addition of a small quantity of sulphate of lime to the solution, putrefaction ensues at once, and is violently declared by an excess of that chemical; second, the solubility is increased by an alkaline solution, and becomes maximum by lixiviation with potassa or soda, or with diluted ammonia; third, by mixing one per cent. of lime with ninety-nine per cent. of the organic product in solution the latter emits traces of ammonia, and by boiling said solution the emission of ammonia is constant and strong; fourth, the organic products in solution, either with or without the addition of an alkaline substance, are not precipitated by mineral acids, and imperfectly so by bichloride of mercury, while they may be thoroughly precipitated by the addition to the solution of a small quantity of ferrocyanide of potassium and a few drops of acetic acid. This precipitation is effected by the formation in the solution of sulphide of sodium or potassa, by adding soda or potassa first, and then sulphureted hydrogen, and by decomposing the sulphide of sodium by a mineral or organic acid.

It will be understood that the organic products of wool, horn, leather, &c., when treated in my improved apparatus, as specified above, may be employed as fertilizers, either by themselves or as composts. In the latter case I employ, by preference, the following mixtures:

First—
| | | |
|---|---|---|
| Dried and pulverized organic product of leather, horn, or wool, and similar substances. | 89 | per cent |
| Quicklime | 1 | " " |
| Sulphate of ammonia, product of distillation | 10 | " " |
| | 100 | |

Second—
| | | |
|---|---|---|
| Organic product | 35.6 | per cent |
| Quicklime | .4 | " " |
| Sulphate of ammonia | 4 | " " |
| Superphosphate of lime | 60 | " " |
| | 100 | |

In the accompanying drawings, Figure 1 is a vertical section, and Fig. 2 a plan, of the apparatus, constructed according to my invention. Fig. 3 is a vertical section of the exhaust-chamber, supporting the aspirators, and showing the construction of the latter, and Fig. 4 is a modification of the receiver A.

A is the receiver, provided with a charging-tube, $A^1$, for the introduction of the material, and having a perforated bottom, $a$, the sides of the receiver being also partially perforated, as shown at $a'$. The receiver A is surrounded by a casing or steam-jacket, B, and the two are located in a flue or heating-chamber, C, as shown by Fig. 1. The exterior of the jacket B is kept at the proper temperature by hot air, the products of combustion from the furnace of the steam-engine supplied thereto by the pipes D $D^1$. The pipe $D^1$ is connected with a pipe, $D^2$, supplying cold air to $D^1$, the supply of hot and cold air being regulated by graduated cocks $d^2$ $d^3$, and by these means the temperature in the flue or heating-chamber is regulated and controlled. The condition of the temperature both in the pipes D and $D^1$, as well as in the heating-chamber C, may at all times be ascertained by means of the thermostats $d$ $d^1$ $c$, with which the pipes D $D^1$ and the chamber C are provided, as shown by Fig. 2. By these means a great saving in heat and steam is effected, as these products of combustion are impelled by the exhaust steam of the engine by the usual or any preferred method, and the waste steam from the generator and superheater after having performed its functions in the apparatus.

$E^1$ is a pipe connected with the steam-generator, and E is a similar pipe connected with the superheater, (neither engine, generator, or superheater being shown in the drawings, as they may be of any approved or preferred construction.) The pipes E and $E^1$ are provided with regulating-cocks $e$, for controlling the flow of superheated and saturated steam, and are further provided with thermostats $d$, for ascertaining, and by means of the cocks $e$ controlling, the temperature and supply of steam, as required. The pipes E and E¹ unite into one pipe at E², Fig. 2, and by this arrangement superheated and saturated steam are supplied to the steam-jacket B, either separately or together, through the pipe E² and connecting-pipe E³, and the temperature in the steam-jacket B is controlled and regulated by the admission of variable quantities of superheated and saturated steam. The pipe E² is also provided with a stop-cock, $e^2$, and thermostat, $d$, by means of which the supply and temperature of the combined steam are regulated and ascertained, and the pipe E³ is also provided with a stop-cock for regulating the supply of steam or shutting it off when it is desired to cleanse the receiver A, as hereinafter explained. The steam supplied by pipe E³ to the jacket penetrates into the receiver and the material contained therein through the perforated bottom $a$ and perforations in the side, and when the heat has reached from 180° to 190° the material contained in the receiver becomes soft, and by raising this heat to 215° or 220° it will at once enter into ebullition, whether leather, horn, wool, or other similar substances are treated. The condition of the material may at any time be ascertained by means of the stirrer F with which the receiver A is provided, as shown by Fig. 1. This stirrer is revolved by means of a handle, $f$, affixed to its axis $f^1$, one end of which rests in a socket, $f^2$, in the bottom of the receiver A. The other end projects through the receiver A, and connecting gas or vapor pipe G, and a suitable packing-box, plainly shown by Fig. 1. As soon as the material enters into fusion the viscous liquid will flow into the steam-jacket B through the perforated sides and bottom, which is made concave, and drop onto the bottom $b$ of the jacket B, which, on the contrary, is made convex, as shown, so as to collect the liquid mass more around its periphery for the better and easier removal of the same, and when a charge or sufficient quantity has run through it is withdrawn therefrom by opening the stop-cock of the siphon-tube L, when the viscous liquid will at once be forced out through tube L by the pressure of the steam in the jacket. The pipe M, connecting with the siphon-tube L outside of the steam-jacket, is surrounded by a steam-jacket, $m$, into which steam is injected through pipe N connecting with pipe E², in Fig. 2, for the purpose of keeping the material in a liquid state until it reaches the receiver, as it will solidify as soon as exposed to cold air, and becomes hard and very brittle, hence very friable and highly assimilable. It is also readily putrefied, being deprived of a greater part of its phosphoreted and sulphureted properties, as well as a great portion of its nitrogen, which is the retarding agent of putrefaction, and the presence of which in the products of such materials as leather, wool, horn, or others has prevented their use as fertilizers. These gases, sulphureted and phosphoreted, as well as the nitrogen combined with the steam, pass from the receiver A, through pipe G, into the exhaust-chamber H, into which they pass under the pressure of the steam, and are exhausted from the chamber H by means of a series of aspirators, I. These aspirators consist of a series of tubes having an enlargement or box, $i$, at the end connected with the chamber or tank H; or the box $i$ may be formed on the tank H, the vacuum being effected by injecting a jet of superheated steam supplied by pipe E through pipe K from a nozzle, $i'$, having a capillary or very small orifice, as shown by Fig. 3. The gases are thus carried off from the receiver A and exhaust-chamber H, and forced through a pipe, J, into a condensing or separating apparatus, (not shown in the drawings,) and consisting of a tank or boiler containing milk of lime, which arrests the sulphureted and phosphoreted gases, while the ammonia is eliminated therefrom, and, purified by its circulating in contact with superheated steam, is carried off into a tank lined with lead through a pipe, the end of which is provided with a funnel-shaped device, the enlarged part downward, and which has its periphery perforated. This funnel-shaped end of the lead pipe is partially submerged in a bath of sulphuric acid contained by the tank, and the result is the constant formation of sulphate of ammonia, which is deposited in crystals on the walls of the tank and removed upon a screen or sieve affixed in the upper part of said tank, where it is allowed to drain off and dry, and is then removed for use or to be mixed with the fertilizer as compost.

The pipe G is provided with a stop-cock, $g$, and a thermostat, $g'$, so as to control the pressure of the steam and gases, and at all times ascertain their temperature.

The exhaust-chamber H may, if desired, be used as a separating-tank, by providing the end of the pipe G with a funnel-shaped extremity, the enlarged part downward, and having its periphery perforated and partially submerged in a bath of milk of lime, so that the pressure of the gases may produce sufficient agitation for the elimination of the phosphoreted and sulphureted gases from the ammonia which is then in conjunction with steam carried off and treated as already explained.

I have not shown in the drawings the construction of the apparatus for eliminating the gases or for obtaining the sulphate of ammonia, as they may be of any preferred or known construction and arrangement.

When the receiver is to be cleaned of obstructions closing the perforations of the bottom and sides, caused by the cooling of remnants of the viscous material, or from particles of solid material lodged therein, the stop-cock of the pipe E³ is first closed, as well as that of the pipe G. Steam is then admitted direct into the receiver A through pipe N', connected with pipe E² and pipe G, immediately in front of the stop-cock $g$ of said pipe, as shown by Fig. 2, the steam passing down pipe G into the receiver, and forcing the obstructions into the jacket B.

By substituting the receiver O, Fig. 4, to the steam-jacket B and receiver A, blood from slaughter houses may be treated in a similar manner, the bottom $o$ of the receiver being perforated; but instead of obtaining a viscous semi-liquid mass, the blood is desiccated and removed, deprived of a portion of its chemical components in a dry state, to be used as such as a fertilizer or as a compost, by mixing, as already stated above.

$o^1$ is the connection with pipe $D^1$, and $o^2$ with pipe $E^2$; $o^3$, thermostat, and $o^4$ with pipe G.

The operation in the treatment of blood is in all respects similar to the one already described.

Having now described my invention, I wish to have it understood that I do not wish to confine myself to any particular arrangement of the apparatus described, as this may be modified to suit the circumstances or particular requirements of the locality where employed; nor do I wish to limit myself to the material employed in its construction, as any suitable material capable of withstanding the action of steam and the gases may be employed; but

What I claim, and desire to secure by Letters Patent, is—

1. In an apparatus for converting leather, horn, wool, or other nitrogenous substances into a fertilizer, the receiver A, having a part of its sides perforated, and a perforated bottom, $a$, in combination with the jacket B, stirrer F, pipes E $E^1$ $E^2$ $E^3$, and a steam generator and superheater, arranged and operating as and for the purposes specified.

2. The jacket B and chamber C and perforated receiver A, in combination with the pipes E $E^1$ $E^2$ and D $D^1$, for the purpose of controlling the heat in said chamber and receiver, substantially as set forth.

3. The perforated receiver A, in combination with the pipe G, exhaust-chamber H, the aspirator I, and the pipes K E, arranged and operating as and for the purposes described.

4. The perforated receiver A, jacket B, stirrer F, siphon-tube L, jacketed pipe M, and the pipes E $E^1$ $E^2$ $E^3$ N, all arranged and combined to operate as and for the purposes described.

5. The perforated receiver A and stirrer F, in combination with G, N', and $E^2$, substantially as and for the purposes specified.

HENRI O. P. LISSAGARAY.

Witnesses:
  FREDRIC WEIL,
  ROBT. M. HOOPER.